US012412391B2

(12) United States Patent
Yakupov et al.

(10) Patent No.: US 12,412,391 B2
(45) Date of Patent: *Sep. 9, 2025

(54) SYSTEM, DEVICE AND METHOD FOR OBJECT DETECTION IN VIDEO FEEDS

(71) Applicant: Monitoreal Limited, Limassol (CY)

(72) Inventors: Aydar Yakupov, Pyla (CY); Michael Alatortsev, Stamford, CT (US)

(73) Assignee: Monitoreal Limited, Limassol (CY)

( * ) Notice: Subject to any disclaimer, the term of this patent is extended or adjusted under 35 U.S.C. 154(b) by 36 days.

This patent is subject to a terminal disclaimer.

(21) Appl. No.: 18/484,147

(22) Filed: Oct. 10, 2023

(65) Prior Publication Data

US 2024/0046646 A1 Feb. 8, 2024

Related U.S. Application Data

(63) Continuation of application No. 17/942,699, filed on Sep. 12, 2022, now Pat. No. 11,816,892, which is a (Continued)

(51) Int. Cl.
| | |
|---|---|
| *G06V 20/40* | (2022.01) |
| *G06F 18/40* | (2023.01) |
| *G06T 7/20* | (2017.01) |
| *G06V 10/56* | (2022.01) |
| *G06V 10/75* | (2022.01) |
| *G06V 10/94* | (2022.01) |
| *G06V 20/52* | (2022.01) |
| *G06V 40/16* | (2022.01) |

(Continued)

(52) U.S. Cl.
CPC .............. *G06V 20/41* (2022.01); *G06F 18/40* (2023.01); *G06T 7/20* (2013.01); *G06V 10/56* (2022.01); *G06V 10/75* (2022.01); *G06V 10/94* (2022.01); *G06V 20/46* (2022.01); *G06V 20/48* (2022.01); *G06V 20/49* (2022.01); *G06V 20/52* (2022.01); *G06V 40/172* (2022.01); *H04N 23/90* (2023.01); *G06F 3/04847* (2013.01); *G06T 2207/10016* (2013.01)

(58) Field of Classification Search
CPC ........ G06V 20/41; G06V 10/56; G06V 10/75; G06V 10/94; G06V 20/46; G06V 20/48; G06V 20/49; G06V 20/52; G06V 40/172; G06F 18/40; G06F 3/04847; G06F 18/22; G06T 7/20; G06T 2207/10016; H04N 23/90

See application file for complete search history.

(56) References Cited

U.S. PATENT DOCUMENTS

| | | | | |
|---|---|---|---|---|
| 2006/0251328 | A1* | 11/2006 | Boo | .................... H04N 1/00127 |
| | | | | 382/173 |
| 2015/0086067 | A1* | 3/2015 | Mehta | .................... G06T 1/0071 |
| | | | | 382/100 |

(Continued)

OTHER PUBLICATIONS

Fan et al, ("Salient Region Detection for Object Tracking", SPIE 2012 vol. 8406, 84060G, pp. 1-6) (Year: 2012).*

(Continued)

*Primary Examiner* — Amara Abdi
(74) *Attorney, Agent, or Firm* — Ruggiero McAllister & McMahon LLC

(57) ABSTRACT

Embodiments are directed to a smart camera device that analyzes independent video streams.

20 Claims, 18 Drawing Sheets

Related U.S. Application Data continuation of application No. 16/653,573, filed on Oct. 15, 2019, now Pat. No. 11,475,667.

(60) Provisional application No. 62/745,011, filed on Oct. 12, 2018.

(51) Int. Cl.
*H04N 23/90* (2023.01)
*G06F 3/04847* (2022.01)

(56) References Cited

U.S. PATENT DOCUMENTS

| | | | |
|---|---|---|---|
| 2016/0180861 A1* | 6/2016 | Masuda | G10L 21/0356 704/225 |
| 2017/0169574 A1* | 6/2017 | Xie | G06V 40/23 |
| 2018/0196472 A1* | 7/2018 | Lee | H04N 5/772 |
| 2019/0073538 A1* | 3/2019 | Ashani | G06V 10/774 |
| 2019/0102646 A1* | 4/2019 | Redmon | G06V 20/20 |
| 2019/0132512 A1* | 5/2019 | Jones | H04N 23/698 |
| 2019/0378287 A1* | 12/2019 | Hollander | G06V 10/22 |

OTHER PUBLICATIONS

Chan et al "Salient Region Detection for Object Tracking", SPIE, vol. 8406 No. 1 May 11, 2012 pp. 1-6 (US).

Chen et al. "Region Based Moving Object Detection Using SSIM", 2015 4th International Conference on Computer Science and Technology IEEE, vol. 1, Dec. 19, 2015, pp. 1361-1364 (US).

International Search Report and Written Opinion for corresponding international application PCT/IB2019/001106, 13 pages, dated Jan. 21, 2020.

Fan et al., "Salient Region Detection for Object Tracking" SPIE 2012 vol. 8406, 84060G, pp. 1-6; 2012.

International Preliminary Report on Patentability for corresponding international application PCT/IB2019/001106, 7 pages, dated Apr. 8, 2021.

* cited by examiner

SYSTEM, DEVICE AND METHOD FOR OBJECT DETECTION IN VIDEO FEEDS

CROSS REFERENCE TO RELATED APPLICATIONS

The present application claims priority to U.S. patent application Ser. No. 17/942,699 filed on Sep. 12, 2022, which in turn claims priority U.S. patent application Ser. No. 16/653,573, filed on Oct. 15, 2019, which in turn claims priority to U.S. Provisional Patent Application No. 62/745,011 filed on Oct. 12, 2018, the entirety of each of which is incorporated by reference hereby.

BACKGROUND

"Smart" cameras such as Netgear's Arlo, Google's Nest, or Amazon's "Deep Lens" and "Ring" share the same disadvantages: they require the consumer to use a public cloud service for storage and processing, which raises serious privacy concerns. Additionally, these solutions require the consumer to purchase special purpose "smart" cameras specially configured to work with their respective proprietary interfaces or cloud-based platforms.

Further, such platforms require bundling a camera with a cloud account for data processing. For autonomous systems that need to function without a reliable connection to the Internet, significantly more powerful (50-100×) hardware is utilized by such platforms.

SUMMARY

The following briefly describes a basic understanding of some aspects of the embodiments. Its purpose is merely to present some concepts in a simplified form as a prelude to the more detailed description that is presented later.

In an embodiment, there is provided a device for analyzing video streams comprising: a computer, including: a transceiver for communicating over a network; a memory for storing at least instructions; a processor device configured for edge processing of a plurality of video streams and to perform object detection on a local network independent of a cloud architecture, a plurality of scene detection engines configured to be run in parallel with the processor; and an object detection engine configured to analyze one or more queued frames from the plurality of scene detection engines. The processor is operative to execute instructions that enable actions on the local network independent of the cloud architecture, including at least: individually ingesting the plurality of the video streams; and individually analyzing each of the plurality of video streams running in parallel with each of the scene detection engines; queuing one or more frames from each of the one or more of the plurality of video streams for object detection; and analyzing the one or more queued frames with an object detection engine for object identification; wherein the queuing, analyzing, and identifying are each executed locally on the processing device.

In an embodiment, the processor can be a microcomputer processor.

In an embodiment, the device of can be configured to send an object detection notification if the object detected by the object detection engine meets an object detection rule.

In an embodiment, the device of can be configured to interface with a plurality of cameras over the local network, and wherein the plurality cameras provide the one or more video streams.

In an embodiment, the device of can be further configured to at least:
  determine if the one or more frames from at least one video stream from the plurality of video streams meets a threshold criterion;
  queue only the one or more frames from the plurality of video streams for object detection that meet the threshold criterion; and
  identify and label an object detected in the one or more queued frames analyzed by the object detection engine. The device of can be further configured to at least:
  compute a mean structural similarity index between two frames of the at least one video stream;
  calculate a similarity frame score between the two images;
  determine if the similarity frame score meets the threshold criterion; and
  queue one or more frames from the at least one video stream for the object detection engine if the similarity frame score meets the threshold criterion. The scene detection engine can be further configured to at least:
  calculate a color space difference between the two frames of the at least one video stream;
  determine if the color space difference between the two frames of the at least one video stream meets a color space threshold criterion; and
  queue one or more frames from the at least one video stream for the object detection engine if the difference meets the threshold criterion.

In an embodiment, the device of can be configured to at least:
  identify an object in the one or more frames with the object detection engine; and
  perform object tracking of the identified object in the at least one video stream using the scene detection engine;
  wherein the scene detection engine is configured to track the object in the video stream without queuing frames from the video stream for further object detection by the object detection engine. The scene detection engine can further comprise a pixel scene differential algorithm for object tracking.

In an embodiment, the device of can further comprise a rules engine and can be operatively connected to an interface configured to allow a user to set one or more rules for object detection.

In an embodiment, the device of can further comprise a machine learning engine and a training database comprising training data from the one or more camera feeds, wherein the machine learning engine is configured to tune the scene detection engine, the object detection engine, or both.

In an embodiment, the device can comprise a facial recognition algorithm, and the object detection engine is configured to identify and classify objects identified by the facial recognition algorithm.

In an embodiment, there is provided a method for processing a video stream, the method being performed by a computer system that comprises a processor configured for edge processing of a plurality of video streams in parallel and to perform object detection on a local network independent of a cloud architecture,
  a plurality of scene detection engines configured to be run in parallel with the processor; and
  an object detection engine configured to analyze one or more queued frames from the plurality of scene detection engines a plurality scene detection engines, and
  a computer-readable storage medium encoded with instructions executable by the processor and operatively coupled to the processor, the method comprising, on the local network independent of the cloud architecture:

individually ingesting the plurality of the video streams; and individually analyzing each of the plurality of video streams running in parallel with each of the scene detection engines;

queuing one or more frames from each of the one or more of the plurality of video streams for object detection; and analyzing the one or more queued frames with an object detection engine for object identification;

wherein the queuing, analyzing, and identifying are each executed locally on the processing device.

The method can further comprise sending an object detection notification if an object detected by the object detection engine meets an object detection rule.

In an embodiment, the device can comprise a rules engine being operatively connected to an interface configured to allow a user to set one or more rules for object detection.

In an embodiment, the method can comprise device being operatively connected to a rules engine and comprising an interface configured to allow a user to define an inclusion zone and an exclusion zone for object detection.

The method can further comprise the computer being configured to interface with a plurality of cameras over the network, wherein each camera respectively provides the plurality of the video streams.

The method can further comprise:
determining if the one or more frames from at least one video stream from the plurality of video streams meets a threshold criterion;
queueing only the one or more frames from the plurality of video streams for object detection that meet the threshold criterion; and
identifying and label an object detected in the one or more queued frames analyzed by the object detection engine.

The method can further comprise, the scene detection engine:
computing a mean structural similarity index between two of the frames of the at least one video stream;
calculating a similarity frame score between the two frames of the video feed;
determining if the similarity frame score meets the threshold criterion; and
queuing one or more frames from the at least one video stream for the object detection engine if the similarity frame score meets the threshold criterion.

The method can further comprise, with the scene detection engine:
calculating a color space difference between the two frames of the at least one video stream;
determining if the color space difference between the two frames of the video stream meet a color space threshold criterion; and
queuing one or more frames from the video stream for the object detection engine if the difference meets the threshold criterion.

The method can further comprise:
identifying an object in the one or more of the frames with the object detection engine; and
performing object tracking of the identified object in the at least video stream using the scene detection engine; wherein the scene detection engine is configured to track the object in the at least one video stream without queuing frames from the video stream for further object detection by the object detection engine. The scene detection engine can comprise a pixel scene differential algorithm for object tracking.

The method can further comprise the computer comprising an interface configured to allow a user to set one or more rules for object detection.

The method can further comprise the computer comprising: a machine learning engine; and a training database comprising training data from the one or more camera feeds; wherein the method further comprises tuning the scene detection engine, the object detection engine, or both with the machine learning engine.

In an embodiment, the method can be executed by a microcomputer processor.

In an embodiment, the method can be executed with a computer comprising a rules engine and operatively connected to an interface configured to allow a user to set one or more rules for object detection.

In an embodiment, the method can be executed with a computer comprising rules engine operatively connected to interface configured to allow a user to define an inclusion zone and an exclusion zone for object detection.

In an embodiment, the method can be executed with a computer comprising a facial recognition algorithm, and the method can further comprise identifying and classifying objects identified by the facial recognition algorithm with the object detection engine.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION OF THE EMBODIMENTS

Various embodiments now will be described more fully hereinafter with reference to the accompanying drawings, which form a part hereof, and which show, by way of illustration, specific embodiments by which the innovations described herein can be practiced. The embodiments can, however, be embodied in many different forms and should not be construed as limited to the embodiments set forth herein. Rather, these embodiments are provided so that this disclosure will be thorough and complete, and will fully convey the scope of the embodiments to those skilled in the art. Among other things, the various embodiments can be methods, systems, media, or devices. Accordingly, the various embodiments can take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The term "herein" refers to the specification, claims, and drawings associated with the current application. The phrase "in an embodiment" as used herein does not necessarily refer to the same embodiment, though it can. Furthermore, the phrase "in another embodiment" as used herein does not necessarily refer to a different embodiment, although it can. Thus, as described below, various embodiments can be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a" "an" and "the" include plural references. The meaning of "in" includes "in" and "on."

The following briefly describes embodiments in order to provide a basic understanding of some aspects of the innovations described herein. This brief description is not intended as an extensive overview. It is not intended to identify key or critical elements, or to delineate or otherwise narrow the scope. Its purpose is merely to present some concepts in a simplified form as a prelude to the more detailed description that is presented later.

Illustrative Operating Environment

Figure 1:
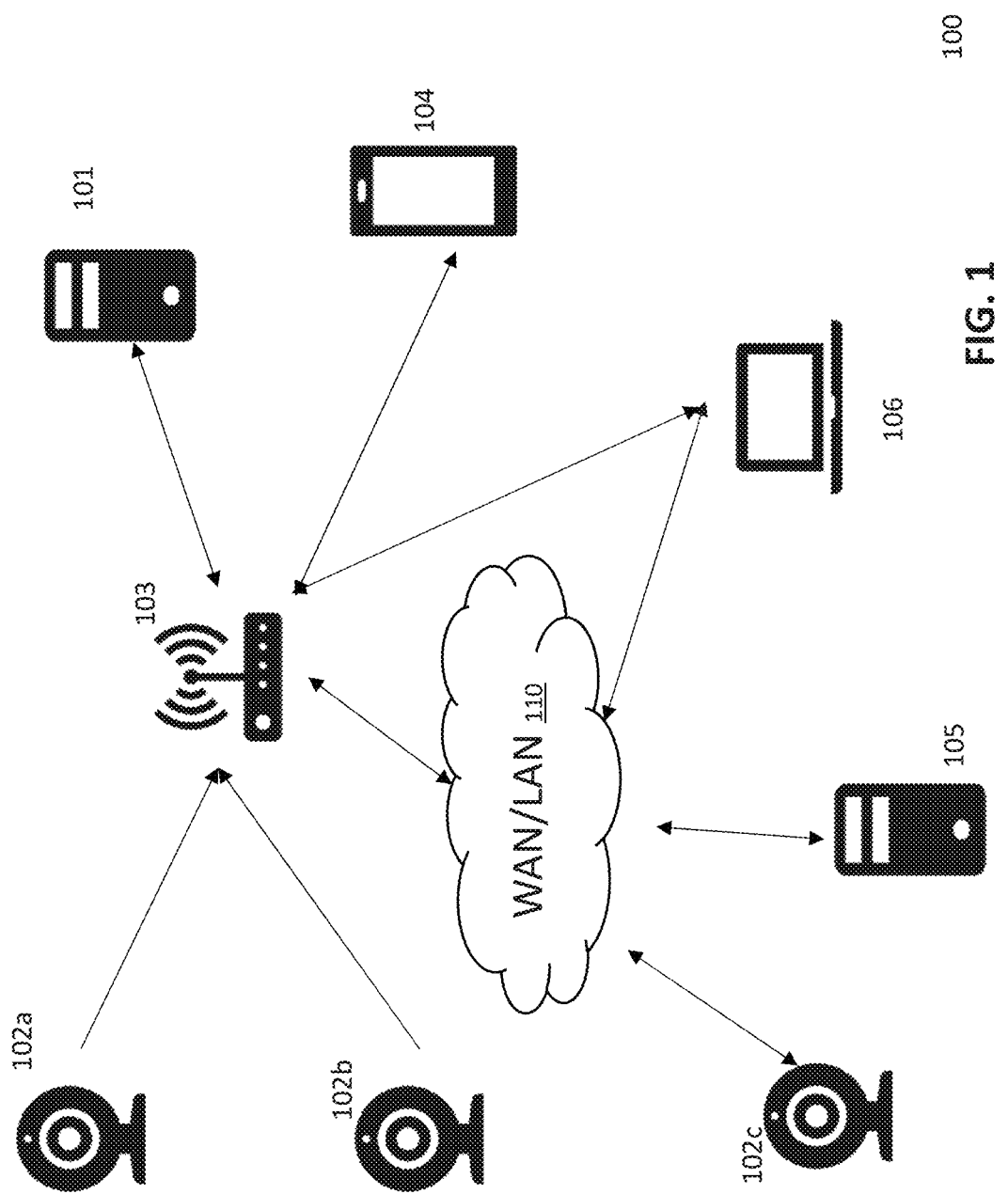
FIG. 1 is a system diagram of an environment in which at least one of the various embodiments can be implemented.

FIG. 1 shows components of one embodiment of an environment in which embodiments of the innovations described herein can be practiced. Not all of the components are required to practice the innovations, and variations in the arrangement and type of the components can be made without departing from the spirit or scope of the innovations.

In at least one of the various embodiments, the system 100 is configured to operate with a simple microcomputer device 101. For example, in an embodiment, the system can include microcomputer built on or more circuit boards, with microprocessor(s), memory, input/output (I/O), a power adapter, an optional LED Matrix (for data output), and a plastic enclosure with one or more cooling fans. An exemplary microcomputer device can be, for example, a Raspberry Pi 3B, or a similar device. The device connects to a user's network 103 wirelessly (WiFi) or via an Ethernet cable. It can then discover cameras 102a, 102b, 102c connected to the same network 103, and allow the user to configure rules for monitoring by each camera 102a,102b, 102c. The system can be configured to connect to and monitor local video feeds as well as remote video feeds provided over a wide area network or the Internet. The system can be configured to work with a conventional IP camera, for example, and IP camera that is configured to be compatible with and operate according to ONVIF standards (Open Network Video Interface Forum Inc.).

Once an initial setup is complete, the device 101 is configured to continuously monitor video feeds from all selected cameras 102a,102b, 102c, identify objects and events in their video streams, and alert the user in real time, for example via a messenger module, for example a chat bot 111, based on predefined rules. An example of a rule would be "if you see a dog during the day—ignore it, but if you see a dog between 10 pm and 6 am—send me an alert". Additionally, the device 101 can monitor itself to identify performance bottlenecks and fine-tune the algorithm. If a hardware (or environment problem is detected (e.g. the device is getting too hot), the device can be configured to notify the user automatically.

The device has a mechanism for updating its own software (e.g. when a new algorithm is released).

The device is designed to connect to an existing network 103 (via WiFi or Ethernet) and automatically discover IP cameras 102a, 102b, 102c connected to the same network. The system is configured with an interface whereby the user can confirm which cameras they want to monitor, and what objects or events interest them.

Exemplary advantageous features include:

A one-to-many architecture: one "box" supporting one or more existing cameras (e.g. 3-5 cameras per box or 4-12 cameras per box).

A selective, cascading algorithm that first performs a light operation on the video frame to determine whether a deeper (more CPU-intensive) analysis is needed.

A self-tuning event processing queue configured to intelligently allocates resources to cameras, based on the amount of action/complexity present in their video frames.

An interactive "chat" interface—where the user can communicate with the device via messenger or chat bot.

Exemplary advantages of the system and device include:

Complete privacy—the system can be configured such that users' video streams need never leave their local network.

The system can operate autonomously, without requiring a cloud architecture to support it.

Low energy use. For example, in an embodiment, a system configured device performs on average at 5 Watts per device on average, vs. hundreds of Watts for alternatives Small footprint—the device is the size of a typical IP camera.

Low hardware cost.

Ease of maintenance.

The device can download new detection algorithms as they become them available, gaining new capabilities.

The system is configured to enable advanced Artificial Intelligence operations such as visual object detection, which conventionally requires expensive high-performance hardware, on low-powered edge devices without the need for a cloud architecture. In an embodiment, local devices are able to operate autonomously and make decisions locally, without sending private information to the cloud for processing.

Figure 2:
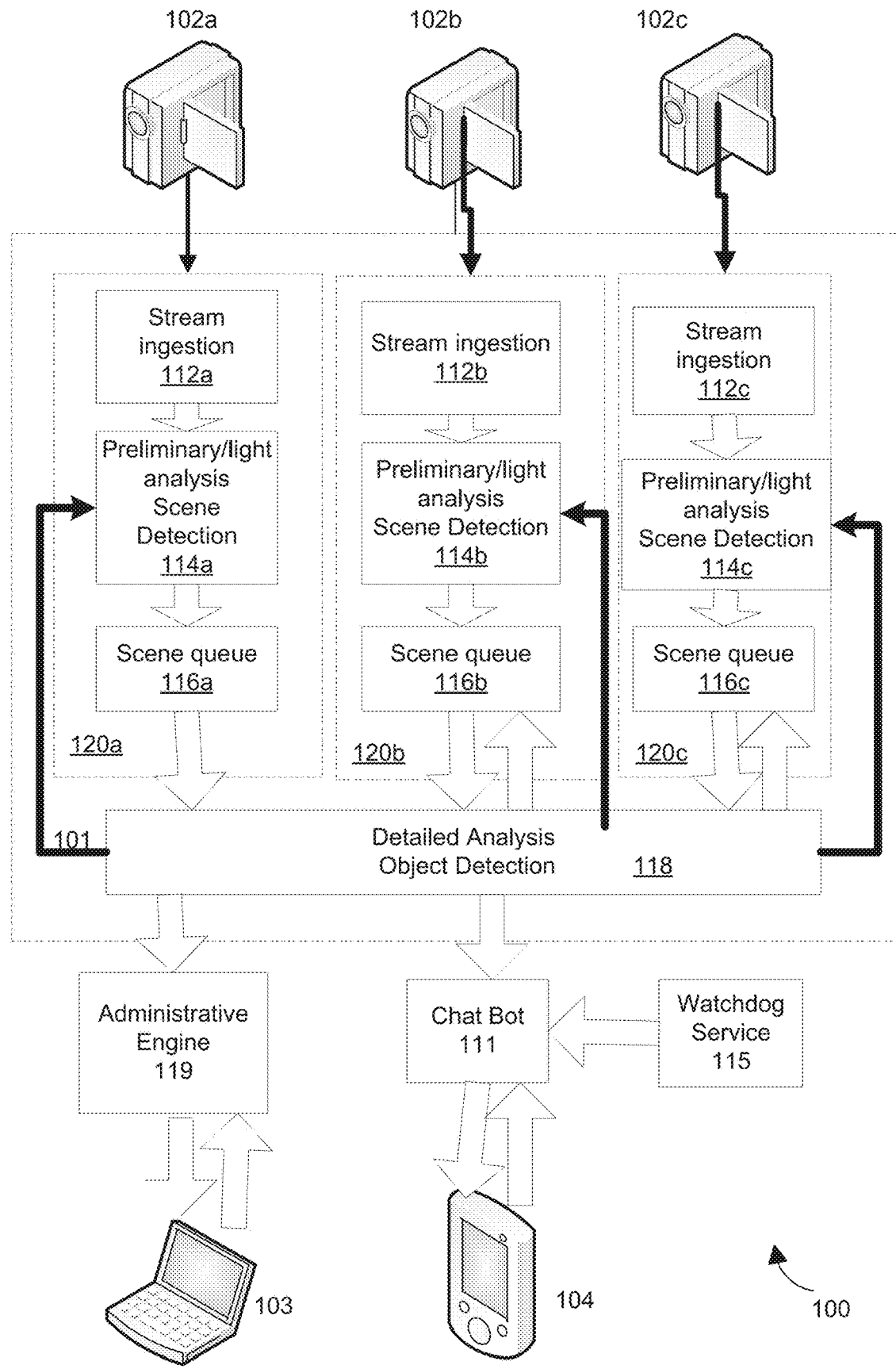
FIG. 2 is a logical architecture and flowchart of a device in accordance with at least one of the various embodiments.
Figure 3:
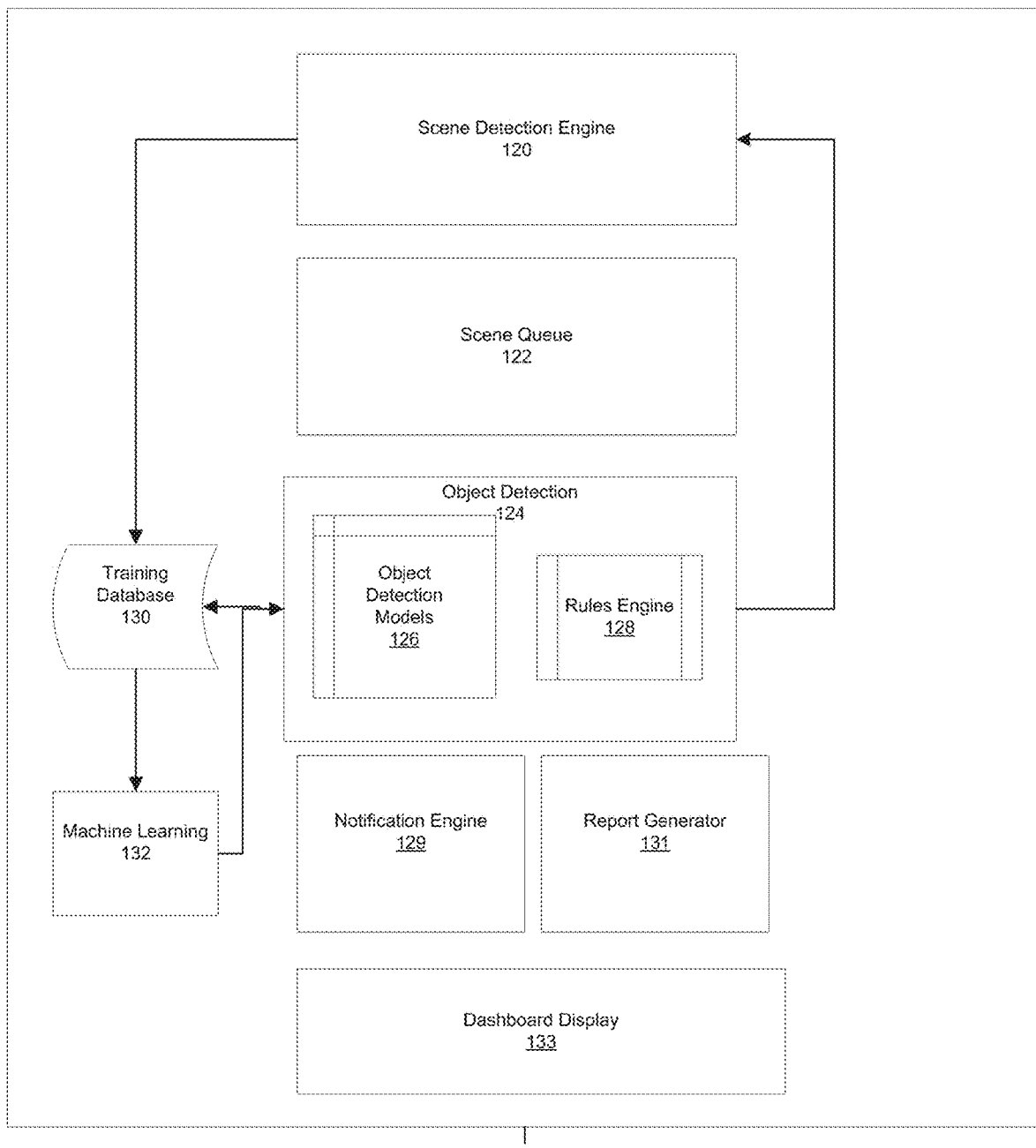
FIG. 3 represents a logical architecture for a device in accordance with at least one of the various embodiments.

FIGS. 2-3 shows one embodiment of an environment and logical architecture and system flow in which embodiments of the innovations described herein can be practiced. In at least one of the various embodiments, described in conjunction with FIGS. 2-3, respectively, can be implemented by and/or executed on a single computer. However, embodiments are not so limited, and various combinations of network computers, client computers, virtual machines, or the like can be utilized.

In at least one of the various embodiments, event information can be stored in one or more data stores, for later processing and/or analysis. Likewise, in at least one of the various embodiments, camera stream information can be processed as it is determined or received. Also, stream information can be stored in data stores, such as databases, for use as, inter alia, a training database.

In an embodiment, the device 101 is configured to monitor individual streams from one or more cameras 102a, 102b, 102c. The system 100 is configured to process multiple video streams from each of the cameras 102a, 102b, 102c. To perform multi-stream monitoring, the device is configured to ingest and process each camera 102a, 102b, 102c stream individually using edge processing. As shown in FIG. 2, for purposes of simplification the illustration shows 3 cameras 102a, 102b, 102c, however the system can be configured to include any number of cameras permitted by the computational power of the device. For example, a system powered by a simple microprocessor device, for example a Raspberry Pi 4 equipped a neural compute module (such as Intel NCS2 or Google Coral), can initially handle up to 12 cameras and individual camera snapshots when configured as described herein. As will be appreciated, the system algorithms can be tuned to handle even more cameras based on computational power needed to process individual feeds, as some feeds can require or be determined to require less processing.

At block 112a, in at least one of the various embodiments, the device 101 is configured to ingest a video stream from an individual camera 102a. At block 114a, the device 101 includes a scene detection engine 120 configured to perform scene analysis. The scene detection engine 120 includes a lightweight algorithm or set of algorithms configured for a quick analysis to determine if the video scenes should be passed down for further, more computationally intensive analysis. A number of scene detection processes can be employed. For example, in an embodiment the device is configured to employ multiple processes of scene detection. One process includes computing a mean structural similarity index between two images, for example a current video frame against a previous video frame, for example as employed in scikit-image image processing in python. An exemplary algorithm for such detection includes, for example:

```
def DifferentEnough(image_a, image_b, scene_threshold):
    # image comparison (scene change detection) here
    ###convert you images to grayscale
    gray_a = cv.cvtColor(image_a, cv.COLOR_BGR2GRAY)
    gray_b = cv.cvtColor(image_b, cv.COLOR_BGR2GRAY)
    # compute the similarity and difference
    (score, diff) = compare_ssim(gray_a, gray_b, full=True)
    diff = (diff * 255).astype("uint8")
    #print("Frame similarity: { }".format(score))
    if score < scene_threshold:
        # scenes are dissimilar (different enough)
        return True
    else:
        # scenes are similar (not different enough)
        return False
```

The exemplary algorithm is configured to perform image comparison and calculate a similarity frame score. If the similarity frame score is less than a scene threshold, at block 116a the system is configured to pass the frames to a scene queue 122 for further analysis.

In an embodiment, the scene detection engine 120 can also configured to employ HSV (hue, saturation, value) to determine a color space difference between frames. An exemplary algorithm for such detection includes, for example:

```
class SceneDetector:
    THRESHOLD = SCENE_THRESHOLD
    def __init__(self, camera_id):
        self.last_hsv = None
        self.camera_id = camera_id
    def is_new_scene(self, frame):
        if not self.last_hsv:
            self.last_hsv = cv2.split(cv2.cvtColor(frame, cv2.COLOR_BGR2HSV))
            logger.info('Camera { }: First frame scene extracted'.format(self.camera_id))
            return True
        if self.frame_mean_is_ok(frame) and self._get_delta_hsv(frame) > self.THRESHOLD:
            self.last_hsv = cv2.split(cv2.cvtColor(frame, cv2.COLOR_BGR2HSV))
            logger.info('Camera { }: New scene detected'.format(self.camera_id))
            return True
        return False
    def _get_delta_hsv(self, frame):
        curr_hsv = cv2.split(cv2.cvtColor(frame, cv2.COLOR_BGR2HSV))
        delta_hsv = [-1, -1, -1]
        for i in range(3):
            num_pixels = curr_hsv[i].shape[0] * curr_hsv[i].shape[1]
            curr_hsv[i] = curr_hsv[i].astype(np.int32)
            self.last_hsv[i] = self.last_hsv[i].astype(np.int32)
            delta_hsv[i] = np.sum(np.abs(curr_hsv[i] - self.last_hsv[i])) / float(num_pixels)
        delta_hsv.append(sum(delta_hsv) / 3.0)
        delta_h, delta_s, delta_v, delta_hsv_avg = delta_hsv
        return delta_hsv_avg
    @staticmethod
    def frame_mean_is_ok(frame):
        frame_mean = np.sum(frame) / float(frame.shape[0] * frame.shape[1] * frame.shape[2])
        return 15 <= frame_mean <= 240
```

The exemplary algorithm is configured to perform image comparison and calculate a scene threshold. If the scene threshold determines there is a new scene, at block 116a the system is configured to pass the frames to a scene queue 122 for further analysis.

The scene detection engines 120a, 120b, 120c are configured to run in parallel for each stream. The scene detection algorithms are lightweight, and configured to detect gross changes in scenes, which can identify simple movements without further analysis for image interpretation.

Such scene detection can identify simple movements, for example, a person or animal running, and rules can be developed to correlate such movements and the need for identification without need for detailed analysis.

For example, once the device begins motion tracking of a detected object and knows an object is (e.g. a person) the device can track it without the need for further detailed analysis. In an embodiment, the device can be configured to perform tracking with the scene detection engine 120 and the preliminary analysis 114 after a detailed analysis 118.

For example, in an embodiment, when a new object appears to the camera 102 (e.g. mailman), the system can be configured to track the new object after the new object is classified (e.g. class: "person") with a detailed analysis 118. The system can be configured to invoke object tracking using the scene detection engine 120 analysis 114, which will track the "blob" as it moves across the screen, without passing the stream for object detection 118 or requiring another reclassification of the object by the object detection engine 124.

In an embodiment, first, the scene detection engine 120 is configured to perform object tracking by identifying the difference between a previous frame (nothing in it) and a current frame with a change in pixels (e.g. with the mailman):

frame_delta=cv2.absdiff(firstFrame, gray)
threshold=cv2.threshold(frame_delta, 25, 255, cv2.THRESH_BINARY) [1]

This results in a blob of pixels. The scene detection engine is then configured to perform number 1 image manipulations in order to find the contours of the "blob":

threshold=cv2.dilate(threshold, None, iterations=2)
contours=cv2.findContours(threshold.copy( ), cv2.RETR_EXTERNAL, cv2.CHAIN_APPROX_SIMPLE)
contours=contours[0] if imutils.is_cv2( ) else contours[1]

Next, the device is configured to select contours more closely matching the expected size of the object (person):

for contour in contours:
    # if the contour is too small for the object, discard it
    if cv2.contourArea(contour)<min_size:
        continue
    # compute the bounding box for the contour so it can be displayed
    (x, y, w, h)=cv2.boundingRect(contour)
    cv2.rectangle(frame, (x, y), (x+w, y+h), (0, 255, 0), 2)
    text="person"

Next, a first frame (nobody in it) serves as a "background", and any subsequent frames (with the mailman) will be compared against it as the scene detection engine 120 continues tracking. The system is then configured to repeat the process above for each new frame, until the frame sequences (scenes) stop changing.

As will be appreciated, once the system has identified an object via the detailed analysis 118, the system can then be configured to use the lightweight scene differential analysis to track the "known" object without having to continue to pass the frames to the object detection engine 124 for repeated analysis.

An exemplary advantage of preliminary processing each individual video stream using individual scene detection is that it allows bespoke processing of each stream, and thus the system can be configured to adjust the parameters for each stream, and hence, each field of view of the camera for that stream, to tailor the scene detection to the area monitored. Another exemplary advantage of preliminary processing each individual video stream using individual scene detection is that it preserves computational processing and memory resources of the device 101, as the lightweight scene detection engine can be selective about scenes it will save and pass on for further analysis.

For example, a system can be configured where one camera 102a is an outdoor camera at a main entrance of an office building, another camera is an indoor camera 102b, and a third camera 102c is a "backdoor" outside camera. The first outdoor main entrance camera 102a can be configured to ignore detection events during business hours. This camera 102a can also be tuned to set a scene threshold to ignore events triggered smaller scene differentials, for example as would be triggered by small animals. The backdoor camera 102b can be configured to ignore detection events between hours for routine deliveries, for example in the morning (e.g. 6:00 am-11:00 am) but can be set to detect events at other times when visitors would not be expected. The indoor camera 102b can also be configured to ignore detection events during work hours and has a scene threshold that detects any indoor movement at other times. The backdoor camera 102c could also be configured to set a color space analysis or scene threshold that ignores movements that are above a threshold that correlates to fast movement by larger objects, for example vehicles traveling on a road in the field of view of the camera.

As noted above, each video stream from each of the plurality of cameras 102a, 102b, 102c is individually analyzed by a scene detection engine 120 configured for that stream. If the scene detection engine 120 determines that a detected event triggers further analysis, at block 116a the device 101 then queues as series of scenes in the scene queue engine 122. The scene queue engine 122 then performs an analysis on the sequence of scenes to capture data and to do video content pre-processing, for example, to clean the data to remove noise. Sequence analysis can determine, for example, movement vectors in the scene sequence, for example, entry, movement in scene, and exit, and can continue to queue the stream while the triggering event is ongoing.

As each camera 102a, 102b, 102c performs scene detection 112a, 112b, 112c and queues scenes 116a, 116b, 116c triggered by the respective scene detection 112a, 112b, 112c, at block 118, each scene queue then sends the pre-processed video content to the object detection engine 124 for detailed analysis. The objection detection engine 124 is configured with a database of detection models 126 and a rules engine 128. In an embodiment, the device 101 can be configured to employ, for example an OpenCV Deep Neural Network (DNN) with pre-trained TensorFlow and Caffe models for detecting a pre-defined set of objects. An exemplary pre-defined set of objects can comprise, in a "background" class, a list of objects such as 'aeroplane', 'bicycle', 'bird', 'boat', 'bottle', 'bus', 'car', 'cat', 'chair', 'cow', 'diningtable', 'dog', 'horse', 'motorbike', 'person', 'pottedplant' 'sheep', 'sofa', 'train', 'tvmonitor'. In an embodiment, an object detection engine 124 configured with a Tensorflow model set can include up to 90 different classes of objects. The object detection engine 124 can be configured to import these models from a provided pathway to the Tensorflow object detection models (e.g. at Github via the pathway <models/research/object_detection/data/mscoco_label_map.pbtxt>).

As will be appreciated, other objection detection models 126 as known to ordinarily skilled artisans, including those available at object model repositories such as Github, IBM, Amazon, or can include proprietary models can be employed for an object detection engine.

In an embodiment, the system can be configured to natively support an Artificial Intelligence (AI) module 132, for example, a neural computational module. In an embodiment, an exemplary neural computation model can be provided by, for example, a low-power AI inference processor configured to run deep neural networks (DNNs) at high performance. The neural computational model can be configured as an add-on, which accelerates the device, making processing up to 10 times faster. The neural computational model can thereby unlock additional object detection and analysis capabilities, for example, more accurate, computing-intensive detection algorithms. An exemplary neural computational model can be provided by, for example, the Intel® Neural Compute Stick 2 (Intel® NCS 2), including Intel Movidius Myriad X VPU processor. Another example of a neural computational model includes a Google Coral Edge TPU USB accelerator, which comprises an on-board Edge TPU coprocessor capable of performing 4 trillion operations (tera-operations) per second (TOPS), using 0.5 watts for each TOPS (2 TOPS per watt). The AI can interface with libraries of trained models object detection modules and optimized computer vision algorithms.

At block 118, the rules engine 128 of the object detection engine 124 can be configured to prioritize object detection analysis as between the respective camera 102a, 102b, 102c streams and object detection. For example, in the implementation described above, the rules engine can be configured to prioritize analysis from the backdoor camera 102c over the indoor camera 102b and the front door camera 102a in the afternoon and early evening, but prioritizes the indoor camera 102b over the backdoor camera 102c and the backdoor camera 102c over the front door camera 102a in the late night.

In an embodiment, the rules engine 128 is configured with rules for object detection. In at least one of the various embodiments, rules engine 128 can be arranged to use one or more filters, tests, rules, regular expressions, pattern matches, heuristics, or the like, for mapping the object detection to actions and/or views. In some embodiments, the rules engine can be arranged to determine the particular, filters, tests, rules, regular expressions, pattern matches, lookup tables, heuristics, or the like, for mapping detected objects to the object detection models. For example, the computer can be configured to employ a particular set of filters and rules for mapping detected objects from a particular camera stream.

For example, in an embodiment, the system can be configured to allow the user to restrict or exclude detection objects identified by the object detection engine 124 for each camera stream. The rules engine 128 can be configured to ignore the objects detectable by the system unless it detects a threshold number of objects. The system can be configured to ignore the objects detectable by the system within a given time frame. For example, when the object detection analysis 118 detects a person, the rules engine 128 could be configured to take no further action unless more than one person is in the feed within a given time frame. (e.g. not to alert a user or save scenes from a feed). The system can be configured to allow the user to configure rules, for example with an administrative engine 120 using a dashboard display 133. An exemplary interface is described with respect to FIGS. 5A-5E.

In an embodiment, the system can be configured to define inclusion zones and exclusion zone. For example, the user can define and select a zone from a camera feed to monitor or ignore using a dashboard display 133 interface. The system can be configured to allow the user to draw a zone for inclusion or exclusion using the dashboard display, for example as described with respect to FIG. 5E, by using a draw tool 220 to draw a bounding box 219 that defines an inclusion zone 218. The system can then be configured to perform object detection for the inside the inclusion zone 218 defined by the user. The system can be configured to ignore objects outside the zone, and only perform frame analysis and object detection inside the bounding box 219.

As will be appreciated, other tools for defining exclusion zones and inclusion zones can be employed. For example, the system can be configured to analyze a feed and identify areas for inclusion zones 218 and exclusion zones 221. The system can be configured to then offer the user the ability to select or not select the areas or object detection analysis. For example, the system can detect that a large portion of a frame is, for example, a wooded area or a highway outside a parking lot being monitored. The system could then offer the user the opportunity to exclude the zone, for example, via the rule interface 207 shown in FIGS. 5A-E.

If the object detection analysis 118 meets a rule criterion, a device 101 notification engine 129 can be configured to deliver an alert to a user, for example, via an SMS message, and email, a chatbot 111 or other messaging interface. For example, if a rule for a camera 102a stream ignores 3 dogs from 6:00:00 am to 10:00:00 pm, but detects dogs between 10:00:01 pm to 5:59:59 am, the notification engine 129 can be configured to send an alert when a dog is detected between 10:00:01 pm to 5:59:59 am.

In an embodiment, the device 101 can be configured to monitor itself to identify performance bottlenecks and fine-tune the algorithm. If a hardware (or environment problem is detected (e.g. the device is getting too hot), the device can be configured to notify the user automatically. In an embodiment, a watchdog service 115 or other customer service can interface with the client device 104, for example via a chatbot 111.

In at least one of the various embodiments, camera stream information from object detection component 124 can flow to report generator 131 and/or Notification engine 129. In at least one of the various embodiments, report generator 129 can be arranged to generate one or more reports based on the object detection analysis 118. In at least one of the various embodiments, reports can include analyzed frames from each camera stream as well as object detection information. In at least one of the various embodiments, reports can be determined and formatted based on one or more report templates. Examples of reports are shown with respect to FIGS. 6A-8.

In at least one of the various embodiments, a dashboard display 133 interface can render a display of the information produced by the other components of the systems. In at least one of the various embodiments, dashboard display 133 can be presented on a client computer 102, 103 accessed over network.

Also, in at least one of the various embodiments, machine learning 132 analysis can include determining information from a record store, such as, training information database 130. Thus, in at least one of the various embodiments, training information database 130 can be a storehouse of stream and frame information that is associated with a camera feed 102. In at least one of the various embodiments, training information can be used to train on a machine learning engine 132 to and tune bespoke algorithms for each individual camera 102a . . . n to be employed by the scene detection engine 120 and the object detection engine 124. For example, in an embodiment, a machine learning engine 125 can comprise a neural net, which trains on analyzed feeds from the object detection engine 124 to determine how the object models determine what objects are detected and labeled, and tune decisioning for the object detection engine 124. The neural net can also train on analyzed feeds from the scene detection engine 120 to determine how the engine forwards feeds for further analysis and can tune decisioning for the scene detection engine 120.

For example, in an embodiment the device can implementing recognition of familiar faces (and other objects, for example, cars), automatically creating a set of previously seen object images that are clustered into groups (e.g. "all these look like one person"), to be further labeled by the user ("that person is my uncle Bob"). After that, the device can recognize the person or object.

In an embodiment, the system 100 can be configured to perform facial recognition. When an object is classified as an object of type "person", the system can be configured to extract an area of the image that corresponds to the face. Facial recognition algorithms as configured to identify certain shapes in relation to each other (e.g.: eyes, nose, mouth) can be employed. The system can be configured to use, inter alia:

HAAR Cascades—very fast (12 frames per second), less accurate
HoG—slower (3 frames per second), more inaccurate
CNN—slowest (0.1 frames per second), most accurate The system is then configured to cluster resulting faces together, based on whether or not they look like the same person. The user can then identify each cluster by labeling the images (e.g.: "Mom", "Uncle Bob").

Once labeled, the system 100 can identify specific individuals, and not just object types. After that, rules can be applied to labeled and recognized individuals as described herein (e.g. "alert me if there's a person after 10 pm, unless it's Uncle Bob").

It will be understood that each block of the flowchart illustration, and combinations of blocks in the flowchart illustration, can be implemented by computer program instructions. These program instructions can be provided to a processor to produce a machine, such that the instructions, which execute on the processor, create means for implementing the actions specified in the flowchart block or blocks. The computer program instructions can be executed by a processor to cause a series of operational steps to be performed by the processor to produce a computer-implemented process such that the instructions, which execute on the processor to provide steps for implementing the actions specified in the flowchart block or blocks. The computer program instructions can also cause at least some of the operational steps shown in the blocks of the flowchart to be performed in parallel. Moreover, some of the steps can also be performed across more than one processor, such as might arise in a multi-processor computer system or even a group of multiple computer systems. In addition, one or more blocks or combinations of blocks in the flowchart illustration can also be performed concurrently with other blocks or combinations of blocks, or even in a different sequence than illustrated without departing from the scope or spirit of the invention.

FIG. 1 shows components of one embodiment of an environment in which embodiments of the innovations described herein can be practiced. Not all of the components can be required to practice the innovations, and variations in the arrangement and type of the components can be made without departing from the spirit or scope of the innovations. As shown, system 100 of FIG. 1 includes local area networks (LANs)/wide area networks (WANs)—(network) 110, wired and/or wireless network 103, cameras 102a-102c and computers 101, 104-106.

The embodiments disclosed herein can be practiced using programmable digital computers. A computer or computer device includes at least one processor or microprocessor coupled to a communications channel. The computer further includes an input device such as, e.g., a keyboard or mouse, an output device such as, e.g., a CRT, LCD or LED display, a communications interface, a data storage device such as a magnetic disk or an optical disk, and memory such as Random-Access Memory (RAM), each coupled to the communications channel. The communications interface can be coupled to a network 103/110.

A data storage device and/or memory can store an operating system. Other programs can be stored instead of or in addition to the operating system. It will be appreciated that a computer system can also be implemented on platforms and operating systems other than those mentioned. Any operating system or other program, or any part of either, can be written using one or more programming languages such as, e.g., Java®, C, C++, C #, Visual Basic®, VB.NET®, Perl, Ruby, Python, or other programming languages, possibly using object-oriented design and/or coding techniques.

One skilled in the art will recognize that a computer system can also include additional components and/or systems, such as network connections, additional memory, additional processors, network interfaces, input/output busses, for example. One skilled in the art will also recognize that the programs and data can be received by and stored in the system in alternative ways. For example, a computer-readable storage medium (CRSM) reader, such as, e.g., a magnetic disk drive, magneto-optical drive, optical disk drive, or flash drive, can be coupled to the communications bus for reading from a computer-readable storage medium (CRSM) such as, e.g., a magnetic disk, a magneto-optical disk, an optical disk, or flash RAM. Accordingly, the computer system can receive programs and/or data via the CRSM reader. Further, it will be appreciated that the term "memory" herein is intended to include various types of suitable data storage media, whether permanent or temporary, including among other things the data storage device, the memory, and the CSRM.

In one embodiment, at least some of computers 101, 104-106 can operate over a wired and/or wireless network, such as networks 103 and/or 110. Cameras 102a-102c can also be computers, although as will be appreciated, the cameras can be any camera device capable of providing a video stream to a device 101 for processing as described herein. Generally, computers can include virtually any computer capable of communicating over a network to send and receive information, perform various online activities, offline actions, or the like. In one embodiment, one or more of computers 101, 102, 104-106 can be configured to operate within a business or other entity to perform a variety of services for the business or other entity. For example, computers 101, 102, 104, 105, 106 can be configured to operate as a web server, a media and video streaming server, a smart camera, administrative computer, or the like. However, computers 101, 102 and 104-106 are not constrained to these services and can also be employed, for example, as an end-user computing node, in other embodiments. It should be recognized that more or less computers can be included within a system such as described herein, and embodiments are therefore not constrained by the number or type of client computers employed.

Computers, including cameras, can include computers that typically connect using a wired or wireless communications medium such as personal computers, multiprocessor systems, microprocessor-based or programmable electronic devices, network PCs, or the like. In some embodiments, computers 101, 102-106 can include virtually any portable personal computer 104, 106 or camera 102 capable of connecting to another computing device and receiving information such as, laptop computer, smart mobile telephone, and tablet computers, and the like. However, portable computers 102, 104, 106 are not so limited and can also include other portable devices such as cellular telephones, display pagers, radio frequency (RF) devices, infrared (IR) devices, Personal Digital Assistants (PDAs), smart cameras, handheld computers, wearable computers, integrated devices combining one or more of the preceding devices, and the like. As such, client computers 101, 102, and 104-106 typically range widely in terms of capabilities and features. Moreover, computers 101, 102 and 104-106 can access various computing applications, including a browser, or other web-based application.

A web-enabled computer can include a browser application that is configured to receive and to send web pages, web-based messages, and the like. The browser application can be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JSON (JavaScript Object Notation), and the like, to display and send a message. In one embodiment, a user of the client computer can employ the browser application to perform various activities over a network (online). However, another application can also be used to perform various online activities.

Computers 101, 102 and 104-106 can also include at least one other application that is configured to receive and/or send content between another computer. The application can include a capability to send and/or receive content, or the like. The application can further provide information that identifies itself, including a type, capability, name, and the like. In one embodiment, client computers 101, 102 and 104-106 can uniquely identify themselves through any of a variety of mechanisms, including an Internet Protocol (IP) address, a phone number, Mobile Identification Number (MIN), an electronic serial number (ESN), or other device identifier. Such information can be provided in a network packet, or the like, sent between other computers.

Computers can further be configured to include a client application that enables an end-user to log into an end-user account that can be managed by another computer, such as a Server Computer 105, Watchdog Server Computer 115, Administrative Computer 106 or the like. Such end-user account, in one non-limiting example, can be configured to enable the end-user to manage one or more online activities, including in one non-limiting example, search activities, social networking activities, browse various websites, communicate with other users, or the like. However, participation in such online activities can also be performed without logging into the end-user account.

Wireless network 103 is configured to couple computers and its components with network 110. Wireless network 103 can include any of a variety of wireless sub-networks that can further overlay stand-alone ad-hoc networks, and the like, to provide an infrastructure-oriented connection for computers. Such sub-networks can include mesh networks, Wireless LAN (WLAN) networks, cellular networks, and the like. In one embodiment, the system can include more than one wireless network.

Wireless network 103 can further include an autonomous system of terminals, gateways, routers, and the like connected by wireless radio links, and the like. These connectors can be configured to move freely and randomly and organize themselves arbitrarily, such that the topology of wireless network 108 can change rapidly.

Wireless network 103 can further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks can enable wide area coverage for mobile devices, such as client computers and cameras with various degrees of mobility. In one non-limiting example, wireless network 103 can enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 103 can include virtually any wireless communication mechanism by which information can travel between client computers and another computer, network, and the like.

Computers can optionally communicate directly with another computer. A network interface can include circuitry for coupling to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols.

Network 110 is configured to couple computers with other computers and/or computing devices, including, Server Computer 105, and Video Server Computer 102c, administrative computer 106, client computer 104, computer 101, and client computers/cameras 102a-102b through wireless network 103. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks can utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links can further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 can be configured to transport information of an Internet Protocol (IP). In essence, network 110 includes any communication method by which information can travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments.

Illustrative User Interface Use Cases

FIGS. 4A-7E represent graphical user interfaces for at least one of the various embodiments. In at least one of the various embodiments, user interfaces other than user interfaces 200, 300 as shown in FIG. 4A-7E can be employed without departing from the spirit and/or scope of the present disclosure. Such user interfaces can have more or fewer user interface elements which can be arranged in various ways. In some embodiments, user interfaces can be generated using web pages, mobile applications, or the like. In at least one of the various embodiments, the system can include processes and/or API's for generating user interfaces, such as, user interfaces 200, 300 as shown in FIG. 4A-7E.

Figure 4A:
FIGS. 4A-4B, 5A-E, 6A-6B, 7A-7E and 8 show user interfaces in accordance with at least one of the various embodiments.

In an embodiment, FIG. 4A illustrates a graphical user interface with five camera feeds 202a, 202b, 202c, 202d, 202e. The interface includes a search interface object 201 configured to allow the computer device to search for and detect camera hardware and connect the camera 202 to the device over the network. Each camera feed is from a different camera 102a-102n, providing streams to the computer device 101. As shown in FIG. 4A feed 202a is a Street feed, 202b is a Parking feed, and cameras 202c-202e are feeds from cameras being provided from servers in remote locations. Each camera feed 202a-202e is provided with control interface objects, including a control 205a-205c to refresh or delete the feed from the interface panel 200 and a control to view the stream online or offline 203a-203e. The feed 202c can also include an object detection sensitivity adjuster 204c configured to adjust the detection sensitivity of the stream analysis.

Figure 4B:
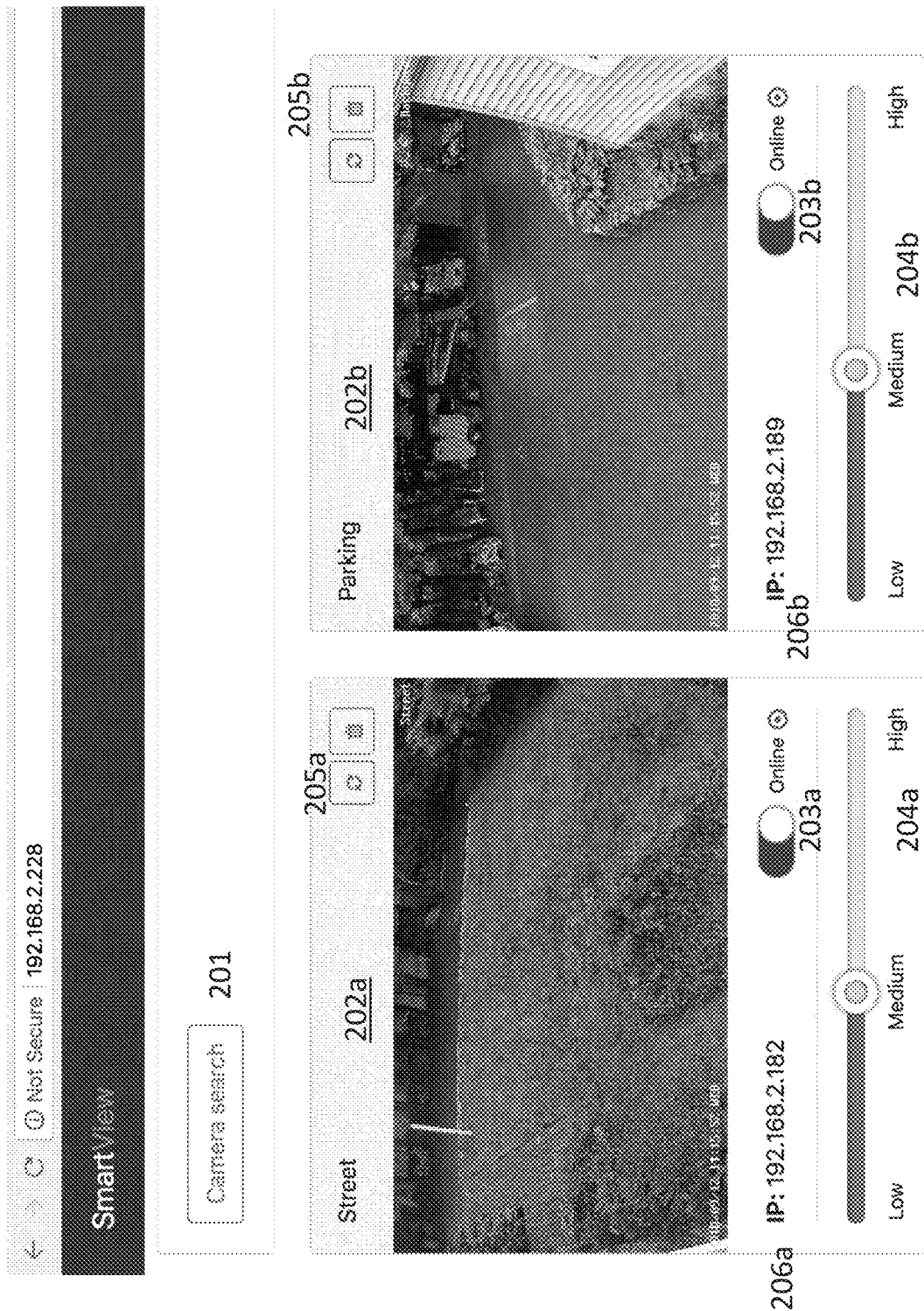

As shown in FIG. 4B, the control interface objects 205c-205e allow the server feeds 202c-202e to be removed from the interface panel, leaving the Street feed 202a and the Parking feed 202b.

Figure 5A:

In an embodiment, interface 200 is configured allow the user to configure rules for each camera feed 202a-202b. As shown in FIG. 5A, the interface 200 include a rule interface 207, which includes selected rules 208a for monitoring the camera feed 202a, a rule activation interface object 209a for activating or deactivating the rule, and an edit or delete interface object 210 for editing or deleting the rule. The rule interface 207 also includes an Add Rule object 211a for adding one or more new rules to the rule interface 207 for that camera feed 202a. The interface 200 for the selected camera feed 202a also includes a View Report 212a object for generating a monitoring report for camera feed 202a.

In the example shown in FIG. 5A, the rule interface 207 shows the Street camera feed 202b has been configured to ignore a person, bicycle, car, motorcycle, a cat, and a dog if only one (1) of these are detected. The activation interface object 209, a toggle switch, shows the rule is active. As explained herein, each rule can be configured to be operative in a given time range.

Figure 5B:
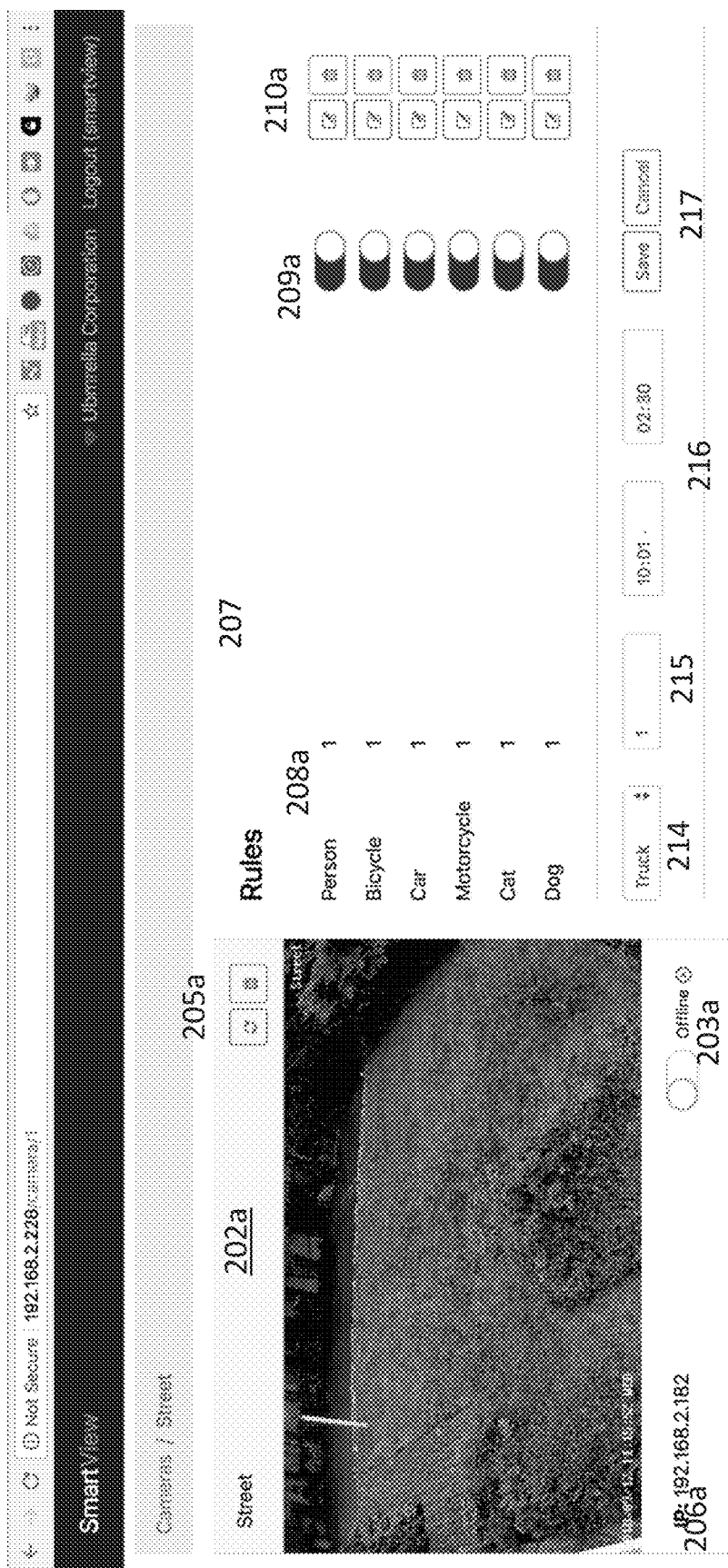
Figure 5C:
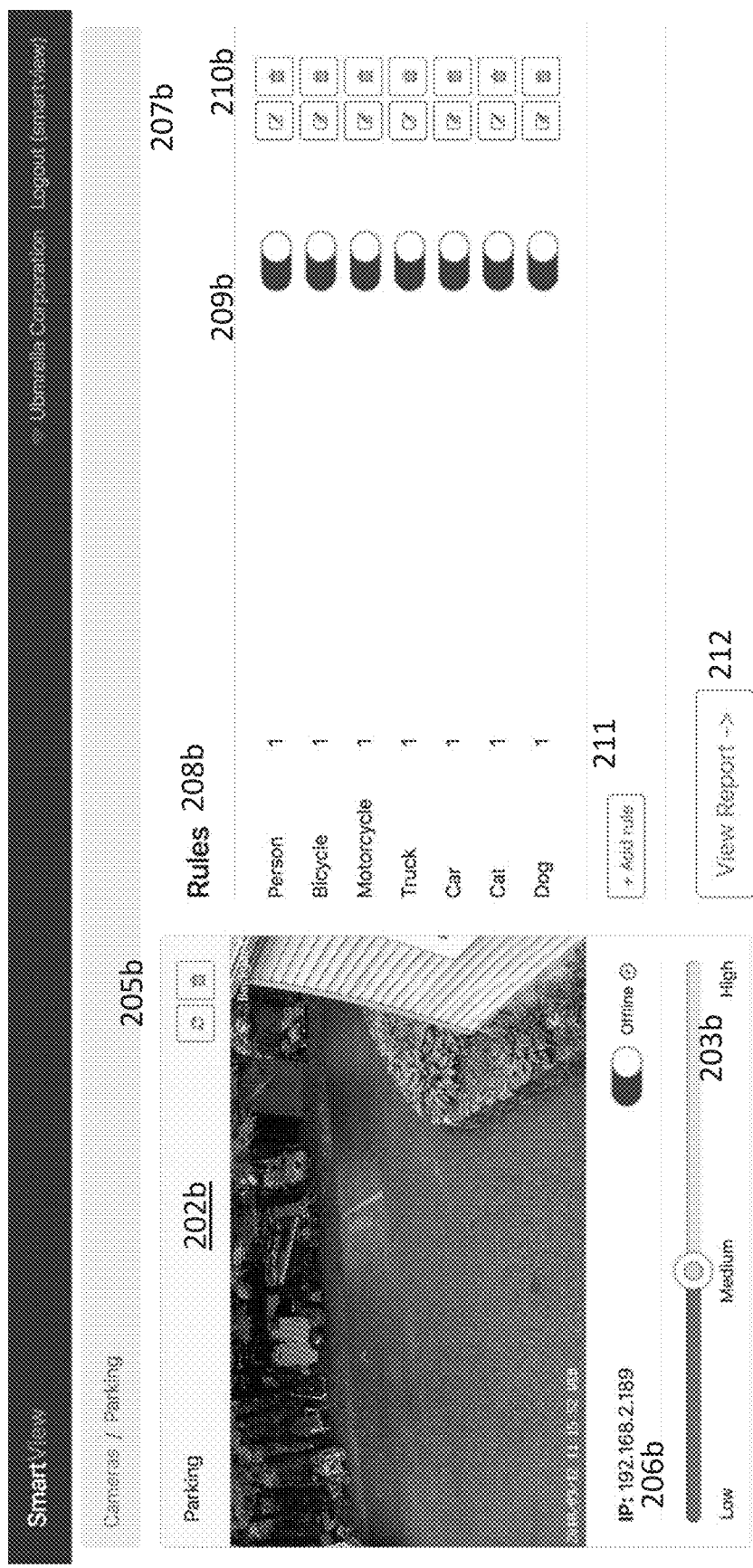
Figure 5D:

As shown in FIG. 5B, the Add Rule object 211a of the rule interface 207 for adding new rules to the rule interface 207 includes a rule configuration area including an object selection field 214, a number field 215, a time range field 216, and a save or cancel interface object 217. In an embodiment, the object selection field 214 can be configured with a drop-down menu including a list of objects that the system 100 can detect, for example from the object detection modules. For example, as shown in FIG. 5D, the drop-down menu includes a Person, Bicycle, Car, Motorcycle, Airplane, Bus, Train, Boat, Traffic Light, and can be scrolled or keyed for more options. In an embodiment, the system 100 can be configured with lists of objects configured for common camera views. For example, the system 100 could be further configured to present sets of objects known or learned (e.g. via machine learning) to be associated with a parking lot, a street view, or a main entrance of a particular business or class of businesses (e.g. doctor's office, a market).

The number field 215 allows the user to select a number for the object selected for which the object detection 118 will "ignore"—that is, it will not send an alert or start active monitoring and tracking. The time range field 216 includes input interfaces for setting a begin and end time for which the rule is operative (e.g. 10:01 am-02:30 pm). Once the rule is configured, it can be saved to the rule interface 207 for that particular camera feed 202a or it can be cancelled using the save or cancel interface object 217.

Figure 5E:

FIG. 5E shows an exemplary embodiment of a system interface configured to define an inclusion zone and an exclusion zone for a camera feed, shown as a video feed for a convention floor. The interface is configured to allow a user to define an inclusion zone 218 for object detection in a monitored video feed 202f from a camera. The system can be configured to perform object detection for the inside the inclusion zone 218 defined by the user, for example by using a draw tool to draw a bounding box that defines an inclusion zone 218. The system 100 is configured to ignore objects outside the zone, and only perform frame analysis and object detection inside the bounding box 219. As will be appreciated, other tools for defining exclusion zones and inclusion zones can be employed. For example, the system 100 can be configured to analyze a feed and identify areas for inclusion zones and exclusion zones. The system 100 can be configured to then offer the user the ability to select or not select the areas or object detection analysis. For example, the system 100 can detect that a large portion of a frame is, for example, a wooded area or a highway outside a parking lot being monitored. The system 100 could then offer the user the opportunity to exclude the zone, for example via the rule interface 207.

Figure 6A:
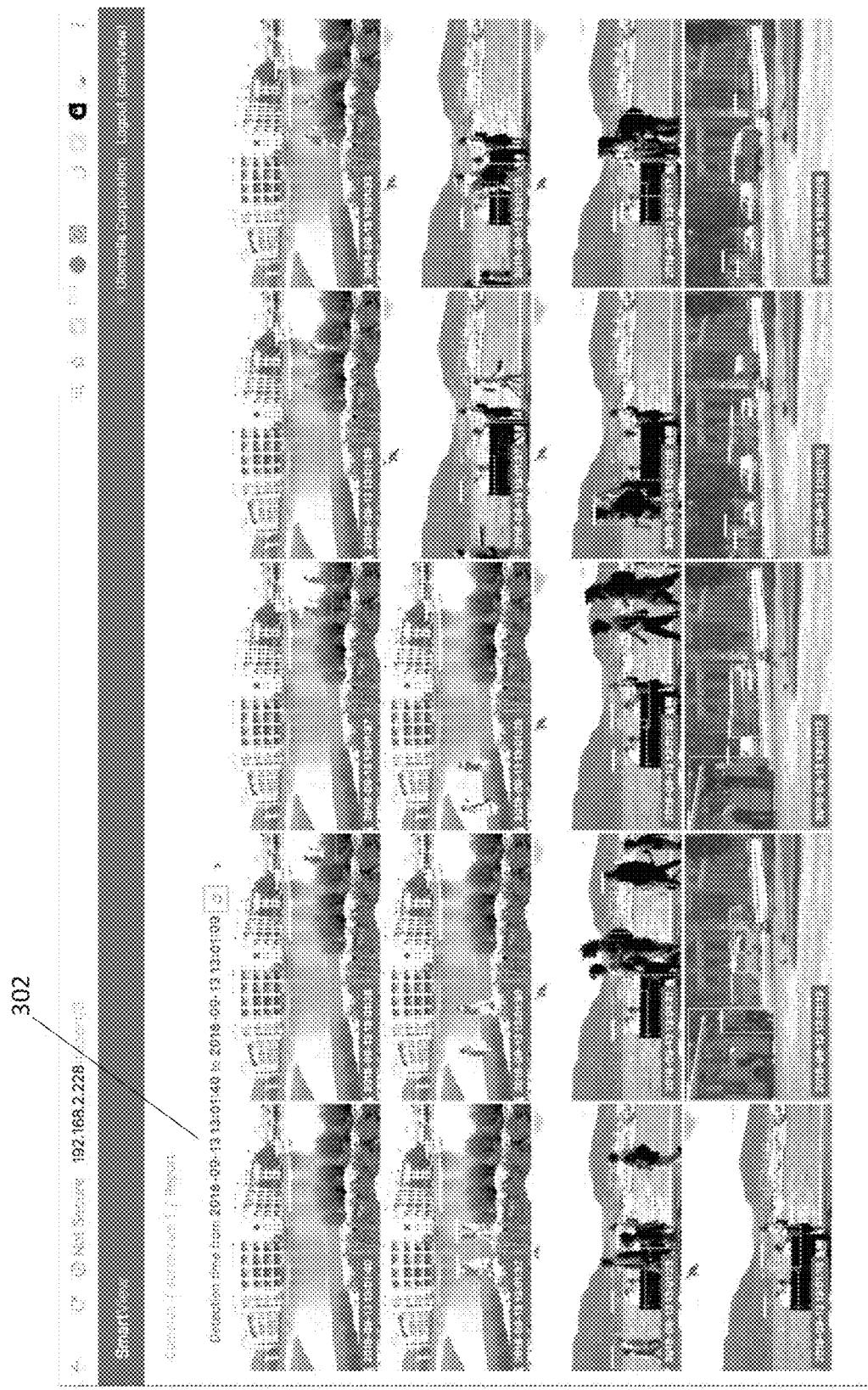
Figure 6B:

As described herein, the interface 200 for a selected camera feed 202 also includes a View Report object 212 for generating a monitoring report for the feed 202. FIGS. 6A-8 show monitoring reports 300 for a camera feed 202. As shown in FIGS. 6A-6B, examples of a report for a server camera feed 202d, 202e show frames that were analyzed and saved when objects triggered the detailed analysis 118. The report 300 gives the detection time ranges 302 and displays the series of frames, and also object detection frames for each of the objects detected by the analysis in each frame.

Figure 7A:
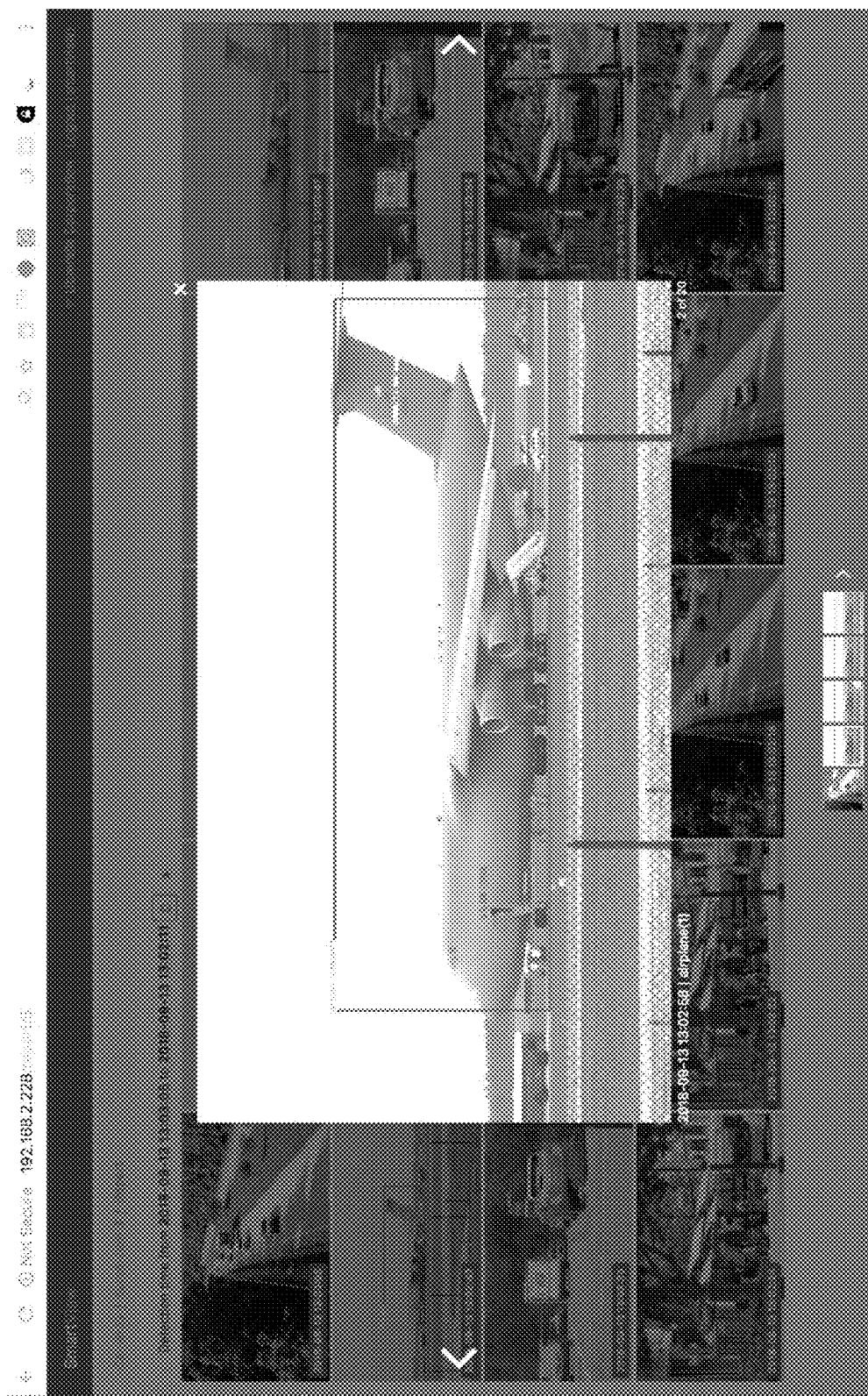

FIGS. 7A-7E, show examples of object detection in selected frames of a report interface 300. As shown in FIG. 7A, upon selecting a frame from the report, the display shows the selected frame stored from the feed and a tag of the object detected in the object detection frame. For example, FIG. 7A shows a single airplane was identified in the frame and the object detection frame labeled as an "airplane" by the object detection engine 124. The frame from the feed is tagged with the time and type and number of objects detected. As shown in FIG. 7A, the frame is tagged as 2018-09-13 13:02:58|airplane(1).

Figure 7B:
Figure 7C:

FIG. 7B shows that 8 persons were identified in the frame, and the object detection frames are labeled as "person" by the object detection engine 124. As shown in FIG. 7B, the frame is tagged as 2018-09-13 13:04:01|person (8). FIG. 7C shows 11 persons were identified in the frame, and the object detection frames are labeled as "person" by the object detection engine 124. As shown in FIG. 7C, the frame is tagged as 2018-09-13 13:37:34|person (11).

Figure 7D:
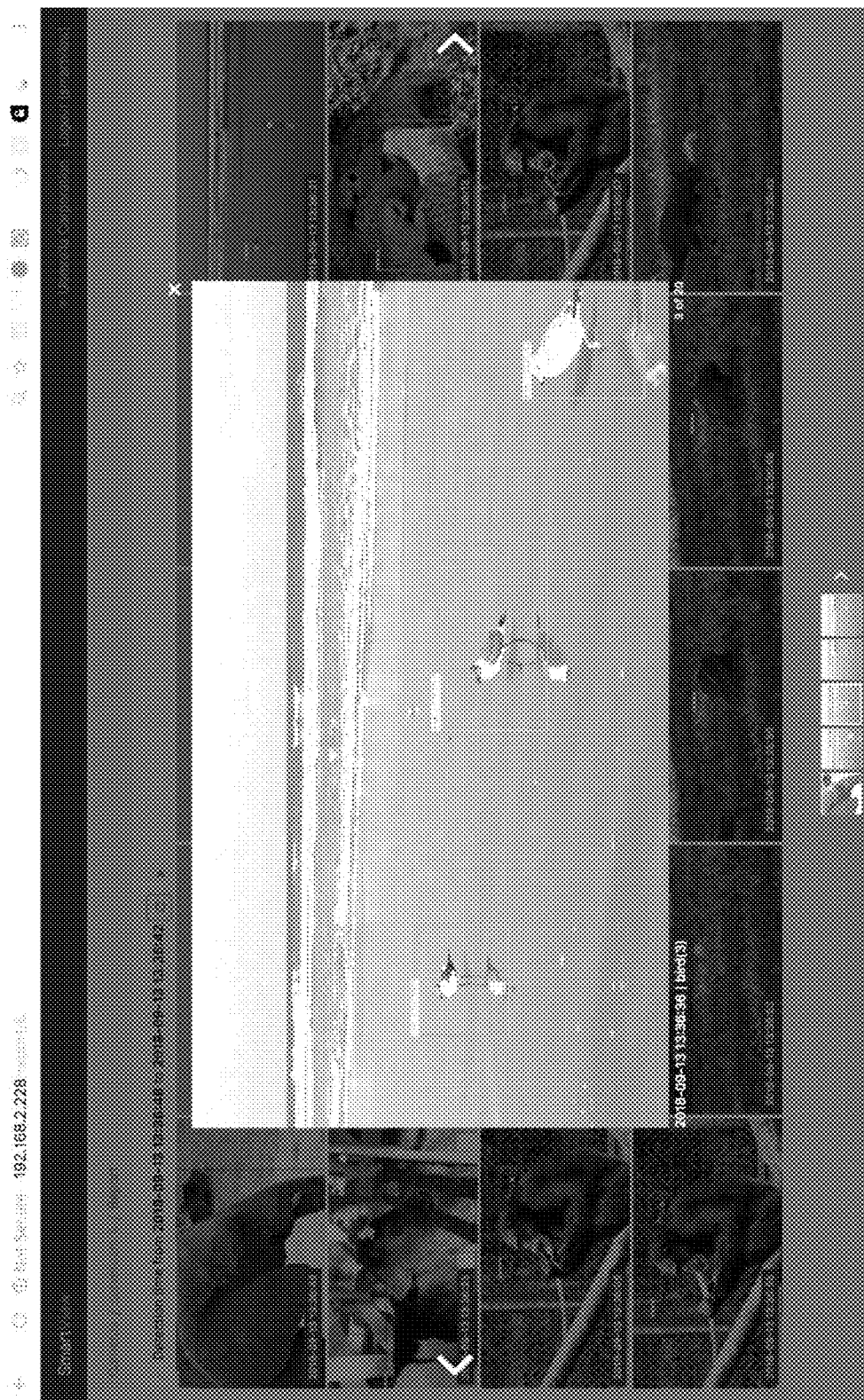

FIG. 7D shows that three birds were identified in the frame, and the object detection frames were labeled as "bird" by the object detection engine 124. As shown in FIG. 7D, the frame from the feed is tagged as 2018-09-13 13:36:36|bird(3).

Figure 7E:

FIG. 7E shows that 5 people and 1 motorcycle were identified in the frame. The 5 object detection frames were labeled as "person" and 1 object detection frame was labeled as "motorcycle" by the object detection engine 124. As shown in FIG. 7E, the frame from the feed is tagged as 2018-09-13 13:36:36|person(3), motorcycle(1).

Figure 8:
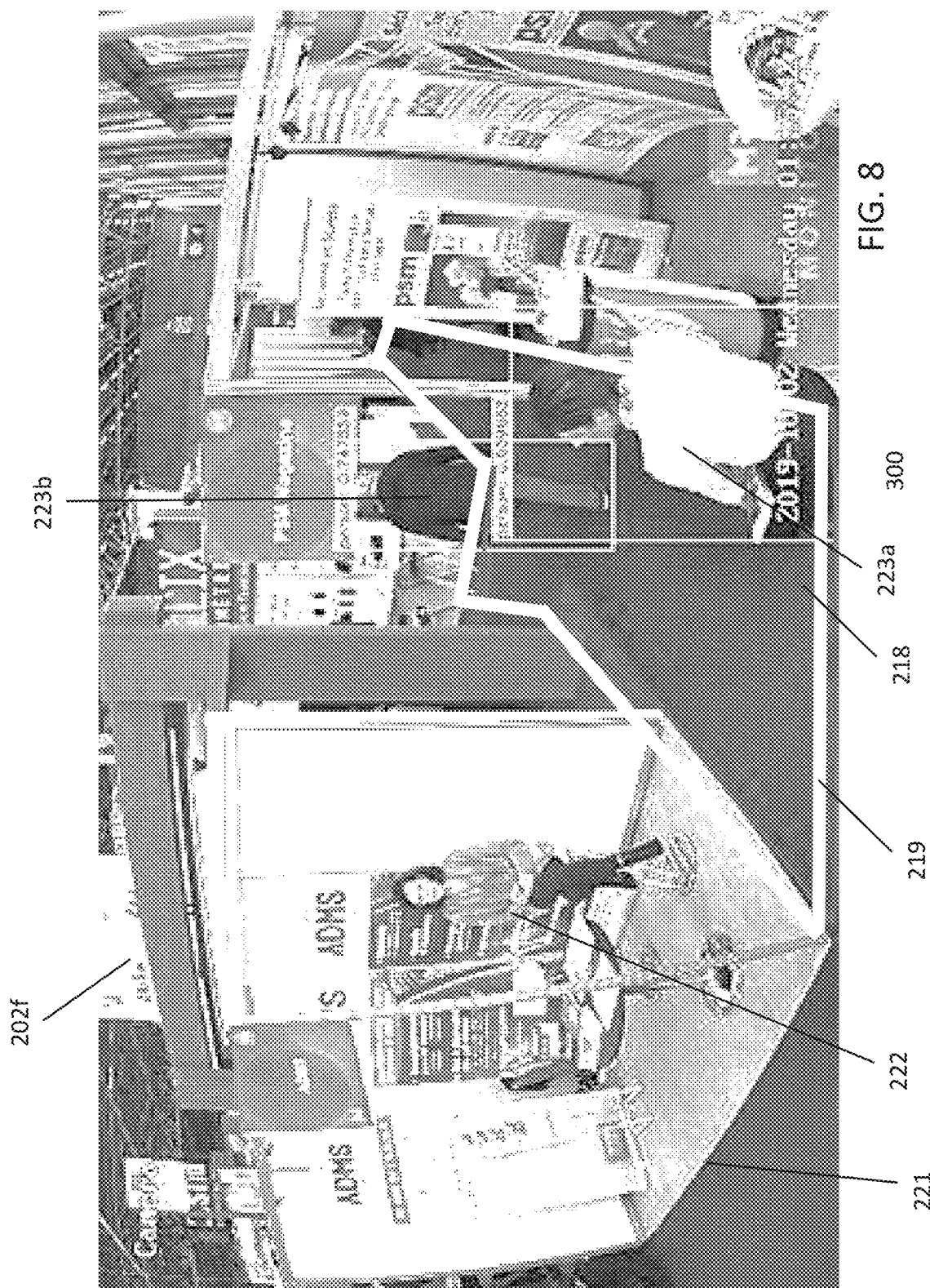

FIG. 8 shows an exemplary embodiment of a report interface 300 for a video feed 202 having an inclusion zone 218 and an exclusion zone 221. As discussed with respect to FIG. 5E, the system 100 is configured to allow a user to define an inclusion zone 218 for object detection in a monitored video feed 202f of a conference floor from a camera. The system 100 is configured to perform object detection for the inside the inclusion zone 218 defined by the user. The system 100 is configured to ignore objects outside the zone, and only perform frame analysis and object detection inside the bounding box 219. As shown FIG. 8, the system 100 identifies 2 people 223a, 223b in the inclusion zone 218, which the object detection engine labels as "person". However, the system 100 ignores the exclusion area 221 outside the bounding box 219, and thus does not identify or label, inter alia, the person 222 in the exclusion area.

The user interfaces 200, 300 have been described using the example of a dashboard suitable for a personal computer, as this is an amenable form for the purpose of explanation. Similar graphical user interfaces with a dashboard format can also be provided as a mobile app, e.g. for Android or iPhone operating systems, where the term "mobile app" refers primarily to a module of applications software capable of running on a smart phone or tablet device or other client computer. Other types of user interface can also be provided. An alternative user interface type is an application programming interface (API), which is the type of user interface which would be suitable for developers who wish to integrate the system as described herein with a third party software application, e.g. to incorporate outputs from the computer device in a flexible manner suited to the third party applications software which is being integrated.

The invention claimed is:

1. A device comprising:
a computer that includes:
a transceiver for communicating over a network;
a memory for storing at least instructions;
a processor configured for edge processing of a plurality of video streams and to perform object detection on a local network independent of a cloud architecture,
a plurality of scene detection engines configured to be run in parallel with the processor on a local device; and
an object detection engine configured to analyze one or more queued frames from the plurality of scene detection engines;
the processor being operative to execute instructions that enable actions on the local network independent of the cloud architecture, including at least:
queuing one or more frames from each of one or more of a plurality of video streams processed in parallel by the parallel processors for object detection; and
analyzing the one or more queued frames with an object detection engine for object identification;
wherein the queuing, analyzing, and object identification are each executed locally on the processor.

2. The device of claim 1, wherein the device is configured to send an object detection notification if the object detected by the object detection engine meets an object detection rule.

3. The device of claim 1, wherein the device is configured to interface with a plurality of cameras over the local network, and wherein the plurality of cameras provide the one or more video streams.

4. The device of claim 1, wherein the device is further configured to at least:
determine if the one or more frames from at least one video stream from the plurality of video streams meets a threshold criterion;
queue only the one or more frames from the plurality of video streams for object detection that meet the threshold criterion; and
identify and label an object detected in the one or more queued frames analyzed by the object detection engine.

5. The device of claim 4, wherein one or more of the plurality of scene detection engines is configured to at least:
compute a mean structural similarity index between two frames of the at least one video stream;
calculate a similarity frame score between the two images;
determine if the similarity frame score meets the threshold criterion; and
queue one or more frames from the at least one video stream for the object detection engine if the similarity frame score meets the threshold criterion.

6. The device of claim 4, wherein one or more of the plurality of scene detection engines is configured to at least:
calculate a color space difference between the two frames of the at least one video stream;
determine if the color space difference between the two frames of the at least one video stream meets a color space threshold criterion; and queue one or more frames from the at least one video stream for the object detection engine if the difference meets the threshold criterion.

7. The device of claim 1, wherein the device is configured to at least:
identify an object in the one or more frames with the object detection engine; and
perform object tracking of the identified object in the at least one video stream using the scene detection engine;
wherein each of the plurality of scene detection engines is configured to track the object in the video stream without queuing frames from the video stream for further object detection by the object detection engine.

8. The device of claim 7, wherein one or more of the plurality of scene detection engines comprises a pixel scene differential algorithm for object tracking.

9. The device of claim 1, further comprising a rules engine that is operatively connected to an interface configured to allow a user to set one or more rules for object detection.

10. The device of claim 1, further comprising a machine learning engine and a training database comprising training data from the one or more camera feeds, wherein the machine learning engine is configured to tune one or more of the plurality of scene detection engines, the object detection engine, or both.

11. A method for processing a video stream, the method being performed by a computer system that comprises a processor configured for edge processing of a plurality of video streams in parallel and to perform object detection on a local network independent of a cloud architecture,
a plurality of scene detection engines configured to be run in parallel with the processor; and
an object detection engine configured to analyze one or more queued frames from the plurality of scene detection engines, and a computer-readable storage medium encoded with instructions executable by the processor and operatively coupled to the processor, the method comprising, on the local network independent of the cloud architecture:
queuing one or more frames from each of the one or more of a plurality of video streams processed in parallel by the parallel processors for object detection; and
analyzing the one or more queued frames with the object detection engine for object identification;
wherein the queuing, analyzing, and object identification are each executed locally on the processing device.

12. The method of claim 11, further comprising sending an object detection notification if an object detected by the object detection engine meets an object detection rule.

13. The method of claim 11, wherein the computer is configured to interface with a plurality of cameras over the network, and wherein each camera respectively provides the plurality of the video streams.

14. The method of claim 11, the method further comprising:
determining if the one or more frames from at least one video stream from the plurality of video streams meets a threshold criterion;
queueing only the one or more frames from the plurality of video streams for object detection that meet the threshold criterion; and
identifying and labeling an object detected in the one or more queued frames analyzed by the object detection engine.

15. The method of claim 14, further comprising with the one or more of the plurality of scene detection engines:
computing a mean structural similarity index between two of the frames of the at least one video stream;
calculating a similarity frame score between the two frames of the video feed; determining if the similarity frame score meets the threshold criterion; and
queuing one or more frames from the at least one video stream for the object detection engine if the similarity frame score meets the threshold criterion.

16. The method of claim 14, further comprising with one or more of the plurality of scene detection engines:
calculating a color space difference between the two frames of the at least one video stream;
determining if the color space difference between the two frames of the video stream meet a color space threshold criterion; and
queuing one or more frames from the video stream for the object detection engine if the difference meets the threshold criterion.

17. The method of claim 11, further comprising:
identifying an object in the one or more of the frames with the object detection engine; and
performing object tracking of the identified object in the at least video stream using one or more of the plurality of scene detection engines;
wherein the one or more of the plurality of scene detection engines is configured to track the object in the at least one video stream without queuing frames from the video stream for further object detection by the object detection engine.

18. The method of claim 17, wherein the one or more of the scene detection engines comprises a pixel scene differential algorithm for object tracking.

19. The method of claim 11, wherein the computer comprises an interface configured to allow a user to set one or more rules for object detection.

20. The method of claim 11, wherein the computer comprises:
a machine learning engine; and
a training database comprising training data from the one or more camera feeds;
wherein the method further comprises tuning one or more of the plurality of scene detection engines, the object detection engine, or both with the machine learning engine.

* * * * *